Jan. 31, 1950 C. S. PACKER ET AL Re. 23,193

HEADLIGHT LANTERN

Original Filed Oct. 11, 1945 2 Sheets-Sheet 1

INVENTORS.
Charles S. Packer,
BY Marvin R. Olsen,

Wilkinson Huxley Cynor & Knight
Attys.

HEADLIGHT LANTERN
Original Filed Oct. 11, 1945 2 Sheets-Sheet 2
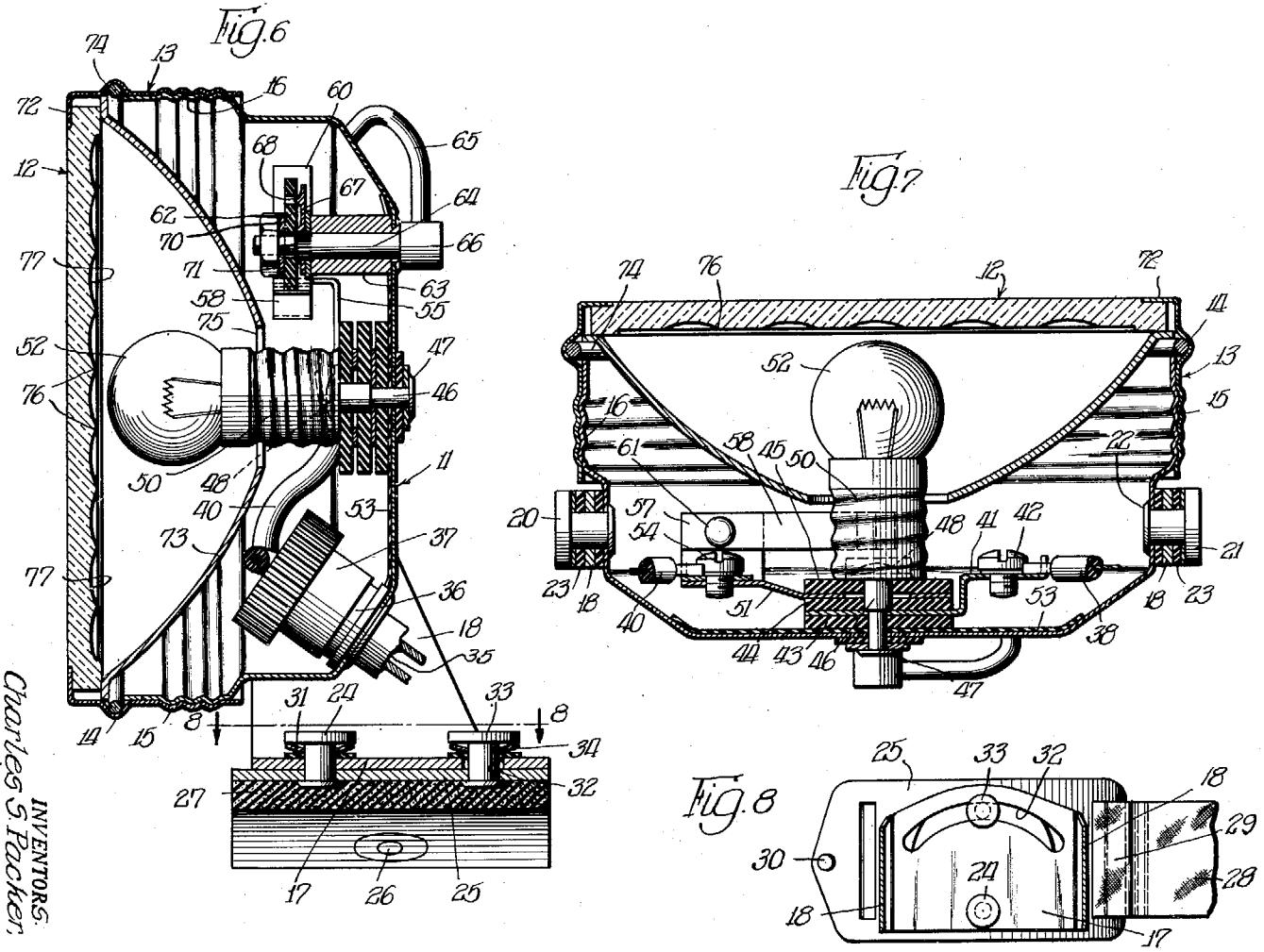
INVENTORS.
Charles S. Packer,
BY Marvin R. Olsen,
Wilkinson Huxley Byron & Knight
Attys.

Reissued Jan. 31, 1950

Re. 23,193

UNITED STATES PATENT OFFICE 23,193

HEADLIGHT LANTERN

Charles S. Packer, Chicago, and Marvin R. Olsen, Glen Ellyn, Ill., assignors to Justrite Manufacturing Company, Chicago, Ill., a corporation of Illinois Original No. 2,482,287, dated September 20, 1949, Serial No. 621,750, October 11, 1945. Application for reissue November 19, 1949, Serial No. 128,452

9 Claims. (Cl. 240—41)

Matter enclosed in heavy brackets [ ] appears in the original patent but forms no part of this reissue specification; matter printed in italics indicates the additions made by reissue The invention relates to portable lanterns of the flash-light type and has reference in particular to an electric lantern adapted to be strapped to the wrist of the operator and which is electrically connected to a battery also carried by the operator, as, for example, by a belt around the operator's waist.

An object of the invention is to provide a light weight portable lantern of simple construction and which can be economically manufactured in large quantities by production methods.

A further object is to provide a portable lantern having improved switch means of simple construction and which makes electrical contact with the exterior of the lamp socket as one terminal of the switch.

A more specific object is to provide a portable lantern having switch means operable from the rear of the lantern and wherein the rotation of the switch lever beyond "on" and "off" positions is restricted by the casing of the lantern.

Another object is to provide a headlight lantern having a universal swivel mounting with respect to its base and wherein means are provided to retain the lantern in adjusted rotated positions.

A further object resides in the provision of improved headlight lens having a plurality of light diffusing cells of novel design for refracting the light rays received from the source in a manner to provide the maximum diffusion of light.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 6 is a vertical sectional view through the lantern taken substantially along line 6—6 of Figure 4 and looking in the direction of the arrows;

Figure 7 is a horizontal sectional view taken substantially along line 7—7 of Figure 4 and looking in the direction of the arrows; and Figure 8 is a sectional view taken along line 8—8 of Figure 6, illustrating the pivotal mounting for the yoke of the lantern.

Figure 1:
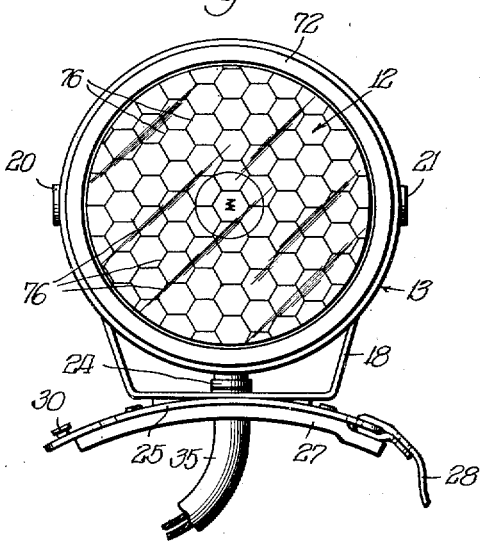
Figure 1 is a front elevational view of the portable electric lantern of the invention.
Figure 2:
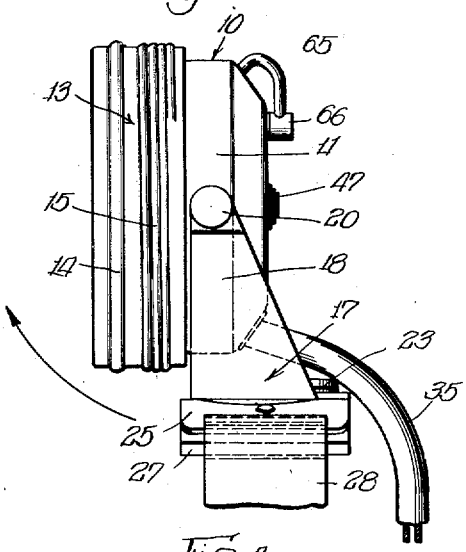
Figure 2 is a side elevational view of the lantern shown in Figure 1.
Figure 3:
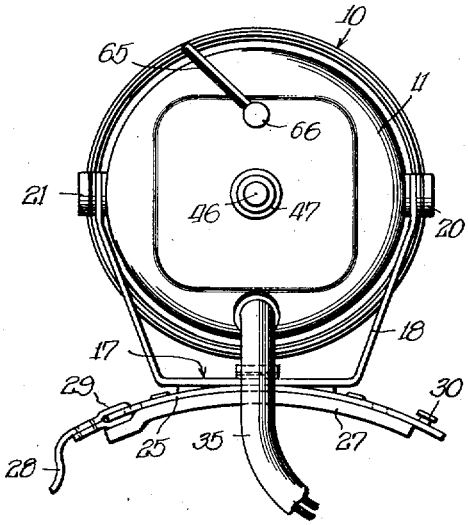
Figure 3 is a rear elevational view.

Referring to the drawings, particularly Figures 1 and 2, the headlight lantern selected for illustrating the present invention is indicated in its entirety by numeral 10. The lantern essentially consists of a casing or housing 11, a glass lens 12, and a retaining ring 13 for the glass lens. The ring 13 is formed with an interior groove 14 extending around the same, and with threads 15 by means of which the ring is threaded to the casing 11, the casing being provided with a threaded portion 16 complementary to the threaded portion 15 of the ring.

A yoke 17 with legs 18 is provided, having pivotal connection through trunnions 20 and 21 with the casing 11 by means of which the headlight lantern is supported for pivotal movement on a horizontal axis. The trunnions are riveted at 22 to the inside of the casing so that the trunnions are journalled on the legs 18 of the yoke, which legs are disposed between friction washers 23, thereby restricting the freedom with which the casing 11 has pivotal movement in the yoke. The trunnion 24 pivotally secures the yoke to the arcuate base 25 which has suitably fixed thereto, by means of rivets 26, the sponge rubber pad 27. Said arcuate base is adapted to be strapped to the wrist or arm of the user, for which purpose the strap 28 is provided, the same being fixed at 29 to one end of the base and having releasable securement by means of stud 30 to the other end of the base. The spring washer 31, retained by the trunnion 24, functions to yieldingly hold the yoke to the base and to restrict the ease with which the yoke may be rotated on the base. As shown in Figure 8, the yoke 17 is provided with a slot 32 which receives the trunnion 33 constructed similar to 24. Said trunnion 33 also retains a spring washer 34 which assists in maintaining the yoke and base in adjusted rotated positions.

Figure 4:
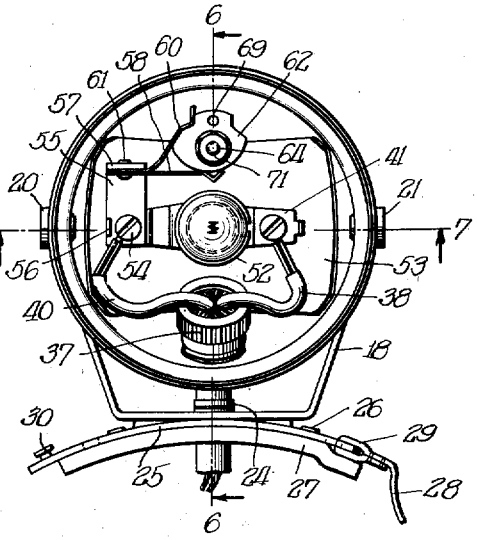
Figure 4 is a front elevational view of the lantern with the headlight lens removed showing the switch mechanism in "off" position.
Figure 5:
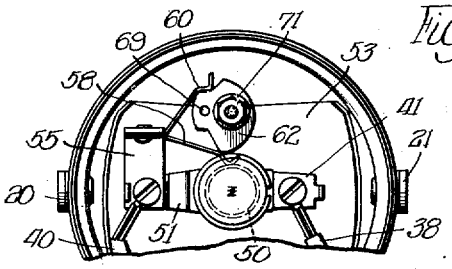
Figure 5 is a fragmentary front elevational view similar to Figure 4 showing the switch mechanism in "on" position.

The headlight lantern of the invention is electrically connected to a battery, not shown, which is also carried by the operator, as, for example, by a belt around the operator's waist. The conductor 35 leads from said battery to casing 11, having entrance into the casing through the hollow stud 36 suitably riveted to the casing centrally of the lower section disposed between the legs 18 of the yoke. The hollow stud 36 is adapted to receive the threaded nut 37 which assists in holding the conductor 35. The leads 38 and 40 have electrical connection with the negative and positive terminals located within the casing. The positive terminal 41 receives the screw 42 which releasably fastens the lead 38 to the terminal. Said terminal 41 is confined between the insulating discs 43 and 44, which discs in addition to 45 are fastened to the rear of the casing 11 by the center stud 46. Said stud is riveted at 47 at the rear of the casing and by means of the head 48 of said stud, the lamp socket 50 and the insulating discs 43, 44 and 45, the positive terminal 41, and the negative terminal 51, are all securely fastened to the casing 11 centrally thereof. The lamp socket receives the light bulb 52 of the lantern in a conventional manner whereby the head 48 which is insulated from socket 50 has electrical contact with the center terminal of the light bulb. As an extra precaution to adequately insure that terminals 41 and 51 are insulated from the casing 11 the structure described, including center stud 46, retains in position the mat 53 of insulating material. As shown in Figures 4 and 5, said mat is substantially rectangular in shape, covering the inside surface of the casing 11 centrally thereof, and thus the mat insulates both negative and positive terminals and the switch structure to be presently described.

Whereas positive terminal 41 has electrical contact with the center stud 46, it will be seen that the negative terminal 51 is not only insulated by the discs 44 and 45 but said terminal has a large central opening so as to prevent electrical contact with the center stud 46. The electrical circuit is closed through the lamp by means of switch mechanism provided with a movable switch member having contact with the lamp socket 50. Negative terminal 51 has a threaded opening for receiving the screw 54 which releasably secures the lead 40 to said terminal.

The switch mechanism has electrical connection with negative terminal 51 by means of the extension 55 best shown in Figure 4. The extension is secured to the negative terminal by the screw 54, being non-rotatably held by the upstanding boss 56 which has interlocking relation with the extension. At its upper end said extension is flanged as at 57, which flanged portion has the switch members 58 and 60 secured thereto by the rivet 61. The switch members are bent at their free ends, giving them a special formation for coaction with the insulating disc 62 comprising the switch actuating means of the present structure. Journalling means indicated by numeral 63, as best shown in Figure 6, is suitably riveted to the casing 11, the said means projecting inwardly of the casing in substantial parallel relation with stud 46 and the lamp socket 50. The journalling means 63 receives the shaft 64 having the switch actuating lever 65 secured to part 66 formed on the rear projecting end of said shaft. The opposite end of shaft 64 fixedly receives a metal part 67 providing a projection 68. The insulating disc 62 is held in a predetermined position on shaft 64 by means of this projection which enters opening 69, Figure 6, provided in the disc for the purpose. The parts are held in desired relation by the washer 70 and nut 71, the latter being threaded to the end of shaft 64 which is provided with threads for receiving the same.

The switch mechanism is shown in "off" position in Figure 4 wherein it will be observed that switch member 60 has coacting relation with the insulating disc 62 in a manner to assist in maintaining the switch in said "off" position. In other words, it is necessary to actuate the lever 65 in a direction to force member 60 to ride over the cam formation formed by the special contour of said insulating disc 62. In so doing member 58 is cammed in a downward direction also as a result of the special contour of said insulating disc 62. When said disc has reached an "on" position member 58 will be in electrical contact with the exterior of lamp socket 50. This position of the switch mechanism is shown in Figure 5. The electric circuit is thus closed through the lamp to light the bulb 52 and the switch mechanism will be held in this "on" position by member 60 in a manner similar to the action of member 60 in holding the insulating disc in an "off" position. An additional feature of the present switch structure resides in the fact that lever 65 has contact with casing 11 when rotated to "on" and "off" position so that further rotation of the insulating disc 62 beyond these positions is prevented by said switch lever. The formation of the switch lever in having its upper end directed toward casing 11 for the purpose above described provides a desirable and convenient member for actuating the switch and which is readily accessible on the exterior of casing 11.

The retaining ring 13 for the glass lens 12 is flanged at 72, which flange has overlapping relation with said lens so that the lens is retained by the ring and confined between the flange and reflector 73. The reflector is backed by the releasable wire clip 74 which seats within the interior groove 14 provided in the retaining ring. The reflector 73 is accordingly positioned forwardly and centrally of casing 11 with the lamp socket 50 and light bulb 52 extending through the opening 75 in the reflector so that the lamp bulb is disposed at the proper focal distance in front of the reflector. However, access to the interior of the casing is possible in the event the bulb needs replacing or repairs are necessary to the switch mechanism. It is only necessary to turn retaining ring 13 to unscrew the same from the casing. To remove the reflector the spring clip 74 must first be removed from its groove 14 and both the reflector and glass lens 12 will be released from retaining ring 13.

The headlight lens 12 is provided with a formation on the interior surface of the lamp for the purpose of producing maximum diffusion of the light rays passing through the lens. As shown in Figure 1, a plurality of configurations 76 are formed on the interior surface of the lens with each formation having a contour approximating a hexagon. In accordance with the invention the inside surface outlined by each hexagon is slightly dished to produce a concavity 77 so that the inside surface of the lens 12 comprises a plurality of small concavities of hexagonal outline with the deepest part of the concavity approximately coinciding with the center of the hexagonal configuration. The light rays from the parabolic reflector are substantially uniformly distributed over the area of the lens 12. Each configuration, as a result of its shape and concave formation, produces the maximum diffusion of the rays received by the same so that each configuration simulates a miniature lens in itself and the entire assembly produces a brilliant light which is readily visible as a signal light for signalling trains or for other uses where a portable lantern as herein described may have utility.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a portable lantern, the combination with a base member adapted to be strapped to a person's wrist, of a substantially cylindrical lamp casing having a rear wall and being rotatably supported on the base member for movement on a diametrical axis, a lamp socket located within the casing centrally thereof, a positive and a negative terminal extending laterally and on opposite sides of the lamp socket, means fixedly securing said lamp socket and terminals to the rear wall of the casing, switch mechanism also located within the casing and including a movable switch member, said movable switch member having electrical connection with one of said terminals, an actuating disc for moving said switch member into contact with the lamp socket, and an actuating lever located exteriorly of the rear wall for actuating said disc.

2. In a portable lantern, the combination with a base member adapted to be strapped to a person's wrist, of a substantially cylindrical lamp casing having a rear wall and being rotatably supported on the base member for movement on a diametrical axis, a lamp socket located within the casing centrally thereof, a positive and a negative terminal extending laterally and on opposite sides of the lamp socket, means fixedly securing said lamp socket and terminals to the rear wall of the casing, switch mechanism also located within the casing and including a shaft journalled by means fixed to the rear wall of the casing, an actuating disc secured to the end of the shaft within the casing, a switch member electrically connected to one of said terminals and actuated by the disc into contact with the lamp socket, and an actuating lever secured to the end of the shaft exteriorly of the rear wall for rotating said shaft.

3. In a portable lantern, the combination with a base member adapted to be strapped to a person's wrist, of a supporting yoke having spaced upstanding legs, means located centrally between the legs for rotatably securing the yoke to said base member, a substantially cylindrical casing having a rear wall and being pivotally secured to the legs of the yoke for rotation on a diametrical axis, a lamp socket located within and secured to the rear wall of the casing, switch mechanism also located within the casing and including a switch member adapted to have electrical contact with the lamp socket, an actuating lever located exteriorly of the casing for actuating said switch mechanism, and a reflector retaining ring member releasably secured to said casing.

4. In a portable lantern, the combination with a base member adapted to be strapped to a person's wrist, of a supporting yoke having spaced upstanding legs, means located centrally between the legs for rotatably securing the yoke to said base member, a substantially cylindrical casing having a rear wall and being pivotally secured to the legs of the yoke for rotation on a diametrical axis, a lamp socket located within and secured to the rear wall of the casing, switch mechanism also located within and being fixedly secured to the rear wall of the casing, said mechanism including a rotatable shaft supported by the rear wall, an actuating disc secured to the end of the shaft within the casing, a switch member actuated by said disc and adapted to have electrical contact with the lamp socket, an actuating lever secured to the end of the shaft exteriorly of the rear wall for rotating said shaft, and a reflector retaining ring member releasably secured to said casing.

5. In a portable lantern, in combination, a substantially cylindrical casing having a rear wall, a metal lamp socket located centrally within the casing, a positive and a negative terminal extending laterally and on opposite sides of the lamp socket, a rivet member fixedly securing the lamp socket and terminals to the rear wall of the casing, switch mechanism also located within the casing and including a movable switch member, said switch member having electrical connection with one of said terminals, an actuating disc for moving said switch member into contact with the lamp socket, a rotatable shaft for rotating said disc, said shaft being supported by the rear wall and extending through said wall exteriorly of the casing, and an actuating lever fixed to said rearwardly extending end of the shaft.

*6. In a portable lantern, the combination with a base member, of a substantially cylindrical lamp casing having a rear wall and being rotatably supported on the base member for movement on a diametrical axis, a lamp socket located within the casing approximately centrally thereof and being fixedly secured to the rear wall in a manner to insulate the socket therefrom, a movable switch member also located within the casing and supported from said rear wall so as to be insulated therefrom, means electrically connecting the switch member with one terminal of a source of electric current, an actuating disc for moving said switch member into electrical contact with the lamp socket, and an actuating lever located exteriorly of the rear wall for actuating said disc.*

*7. In a portable lantern, the combination with a base member, of a substantially cylindrical lamp casing having a rear wall and being rotatably supported on the base member for movement on a diametrical axis, a lamp socket located within the casing and being fixedly secured to the rear wall in a manner to insulate the socket therefrom, switch mechanism also located within the casing and including a shaft journalled by means fixed to the rear wall of the casing, an actuating disc of insulating material secured to the end of the shaft within the casing, a movable switch member having electrical connection with one terminal of a source of electric current, means supporting said switch member for actuation by the disc into electrical contact with the lamp socket, and an actuating lever secured to the end of the shaft exteriorly of the rear wall for rotating said shaft.*

*8. In a portable lantern, in combination, a substantially cylindrical lamp casing of metal having a rear wall, a metal lamp socket located within the casing, a rivet member fixedly securing the lamp socket to the rear wall in a manner to insulate the socket therefrom, a movable switch member also located within the casing and supported from said rear wall so as to be insulated therefrom, means electrically connecting the switch member with one terminal of a source of electric current,*

*said rivet member having electrical connection with the other terminal of said source, an actuating disc for moving said switch member into electrical contact with the lamp socket, and an actuating lever located exteriorly of the rear wall for actuating said disc.*

*9. In a portable lantern, in combination, a substantially cylindrical casing having a rear wall, a metal lamp socket located centrally within the casing, at least one terminal member extending laterally of the lamp socket and having electrical connection with a source of current, a rivet member fixedly securing the lamp socket and said terminal member to the rear wall of the casing in insulated relation with said wall and with each other, switch mechanism also located within the casing and including a movable switch member, said switch member having electrical connection with said terminal member, an actuating disc for moving said switch member into contact with the lamp socket, a rotatable shaft for rotating said disc being supported by the rear wall and extending through said wall exteriorly of the casing, and*

*an actuating lever fixed to said rearwardly extending end of the shaft.*

CHARLES S. PACKER.
MARVIN R. OLSEN.

REFERENCES CITED

The following references are of record in the file of this patent:

UNITED STATES PATENTS

| Number | Name | Date |
|---|---|---|
| Re. 17,745 | Nenzel | Dec. 31, 1929 |
| 1,168,826 | Peterson | Jan. 18, 1916 |
| 1,238,155 | Kleinert | Aug. 28, 1917 |
| 1,240,644 | Bailey | Sept. 18, 1917 |
| 1,241,886 | Rowe | Oct. 2, 1917 |
| 1,278,738 | Petrie | Sept. 10, 1918 |
| 1,397,705 | Shaw | Nov. 22, 1921 |
| 1,692,303 | Horni | Nov. 20, 1928 |
| 1,906,460 | Graham | May 2, 1933 |
| 1,945,198 | Larson | Jan. 30, 1934 |
| 1,948,613 | Britsch | Feb. 27, 1934 |
| 2,133,664 | Lebby | Oct. 18, 1938 |
| 2,224,742 | Muldoon | Dec. 10, 1940 |